United States Patent [19]

Suzuki et al.

[11] Patent Number: 4,792,201
[45] Date of Patent: Dec. 20, 1988

[54] OPTICAL DEFLECTOR DEVICE

[75] Inventors: Makoto Suzuki, Nagoya; Akihiro Suzuki, Nishio, both of Japan

[73] Assignee: Brother Kogyo Kabushiki Kaisha, Aichi, Japan

[21] Appl. No.: 34,049

[22] Filed: Apr. 6, 1987

[30] Foreign Application Priority Data

Apr. 9, 1986 [JP] Japan ................... 61-81580

[51] Int. Cl.⁴ ............................................. G02F 1/29
[52] U.S. Cl. ................... 350/96.14; 350/355
[58] Field of Search ............... 350/96.11, 96.12, 96.13, 350/96.14, 355, 356

[56] References Cited

U.S. PATENT DOCUMENTS

| | | | |
|---|---|---|---|
| 3,795,433 | 3/1974 | Channin | 350/96.14 |
| 3,841,733 | 10/1974 | Ebersole | 350/96.14 |
| 3,870,394 | 3/1975 | Ploeckl | 350/6.8 |
| 4,000,937 | 1/1977 | Kaminow | 350/96.14 |
| 4,070,092 | 1/1978 | Burns | 350/96.14 |
| 4,175,827 | 11/1979 | McMahon | 350/96.14 |
| 4,348,079 | 9/1982 | Johnson | 350/358 |
| 4,396,246 | 8/1983 | Holman | 350/96.13 X |
| 4,413,270 | 11/1983 | Sprague | 346/160 |
| 4,425,023 | 1/1984 | Matsumoto et al. | 350/96.14 |
| 4,468,084 | 8/1984 | Hutcheson et al. | 350/96.11 |
| 4,470,661 | 9/1984 | Matsumoto | 350/96.13 |
| 4,478,483 | 10/1984 | Sprague | 350/96.14 |
| 4,492,970 | 1/1985 | Lee et al. | 346/160 |
| 4,523,803 | 6/1985 | Arao et al. | 350/96.13 |
| 4,548,464 | 10/1985 | Auracher et al. | 350/96.14 |
| 4,611,883 | 9/1986 | Myer | 350/96.12 |
| 4,614,408 | 9/1986 | Mir et al. | 350/388 |
| 4,637,681 | 1/1987 | Yamamoto et al. | 350/96.12 |
| 4,693,548 | 9/1987 | Tsunoi | 350/96.13 |
| 4,705,346 | 11/1987 | Miyawaki | 350/96.14 |
| 4,707,059 | 11/1987 | Ogura et al. | 350/96.13 |

FOREIGN PATENT DOCUMENTS

| | | |
|---|---|---|
| 0021510 | 1/1981 | European Pat. Off. . |
| 0021993 | 1/1981 | European Pat. Off. . |
| 0048441 | 3/1982 | European Pat. Off. . |
| 2359797 | 12/1977 | Fed. Rep. of Germany . |
| 3102972 | 11/1981 | Fed. Rep. of Germany . |
| 3443863 | 6/1985 | Fed. Rep. of Germany . |
| 51-8949 | 1/1976 | Japan . |
| 54-150153 | 11/1979 | Japan . |
| 56-165122 | 12/1981 | Japan .................. 350/96.13 |
| 58-125025 | 7/1983 | Japan . |
| 58-147718 | 9/1983 | Japan . |
| 59-204027 | 11/1984 | Japan . |

OTHER PUBLICATIONS

Mikami, "LiNbO₃ Coupled-Waveguided TE/TM Mode Splitter", *Applied Physics Letters*, vol. 36, No. 7, Apr. 1980, pp. 491-493.

Mitsunaga et al., "Optical Waveguide Isolator in Ti-Diffused LiNbO₃", *Optics Communications*, Dec. 1978, vol. 27, No. 3, pp. 361-364.

Tsao et al., "Photodeposition of Ti and Applicaiton to Direct Writing of Ti: LiNbO₃ Waveguides", *Appl. Phys. Lett.*, vol. 42, No. 7, Apr. 1983, pp. 559-561.

Takizawa, "Electrooptical Fresnel Lens . . . ", *Applied Optics*, vol. 22, No. 16, Aug. 15, 1983, pp. 2468-2473.

*Primary Examiner*— Lee
*Attorney, Agent, or Firm*—Parkhurst, Oliff & Berridge

[57] ABSTRACT

An optical deflector device has a substrate having an electro-optical effect and capable of guiding rays of light therethrough, a buffer layer formed on one of opposite major surfaces of the substrate, and first and second deflection electrodes formed on respective first and second portions of the buffer layer to produce an electric field within the substrate, so that the light rays passing through the substrate are deflected in response to a change in the distribution of a refractive index of the substrate according to a controlled deflection voltage applied to the deflection electrodes. The deflector device includes an isolator for isolating the first and second portions of the buffer layer from each other. The isolator may be a groove or grooves formed through the thickness of the buffer layer to separate the first and second portions. Alternatively, one of the first and second portions of the buffer layer may be removed by forming a cutout in which the corresponding electrode is disposed without contacting the inner surface of the cutout.

9 Claims, 3 Drawing Sheets

OPTICAL DEFLECTOR DEVICE

BACKGROUND OF THE INVENTION

1. Field of the Invention

The present invention relates generally to an optical deflector device utilizing an electro-optical effect, and more particularly to a technique for minimizing a drift of a deflecting angle of a light beam, relative to a voltage applied to the device for controlling the deflecting angle.

2. Discussion of the Prior Art

There is known an optical deflector device which includes a substrate having an electro-optical effect and capable of guiding light rays therethrough, a buffer layer formed on one major surface of the substrate, and a plurality of deflection electrodes formed on the buffer layer to produce an electric field within the substrate. In this type of optical deflector, the light rays passing through the substrate are deflected in response to a change in the distribution of the refractive index of the substrate according to a controlled deflection voltage to be applied between the electrodes.

In such a known type of optical deflector device, the buffer layer provided on one of the opposite major surfaces of the substrate is usually formed as a single film of a suitable material such as silicon oxide ($SiO_2$), by a sputtering or other suitable method. The electrodes are then formed on the thus formed buffer layer, so that the buffer layer prevents the electrodes from absorbing the energy of the light rays passing through the substrate. An extensive study of this known deflector device revealed that the buffer layer formed as a single continuous film tends to easily lack oxygen and become electrically active at its local portions during operation. In this condition, an electric charge is able to move between the deflection electrodes through the electrically activated portion of the buffer layer, while a deflection voltage is applied between the electrodes. As a result, the electric field produced between the electrodes is affected by the movement of the electric charge, whereby the deflection angle is deviated from a set value determined by the controlled deflection voltage. Thus, the known optical deflector indicated above suffers from a "DC drift", i.e., an error in the deflection angle of the light rays with respect to the controlled reflection voltage.

SUMMARY OF THE INVENTION

It is therefore an object of the present invention to provide an optical deflector device which has a buffer layer formed between its substrate and its deflection electrodes, and which is substantially free from a drift of a light deflection angle with respect to the controlled deflection voltage applied to the electrodes.

The above object may be achieved according to the principle of the present invention, which provides an optical deflector device which includes a substrate having an electro-optical effect and capable of guiding light rays therethrough, a buffer layer formed on one of opposite major surfaces of the substrate, and a plurality of deflection electrodes formed on the buffer layer to produce an electric field within the substrate, so that the light rays passing through the substrate are deflected in response to a change in the distribution of a refractive index of the substrate according to a controlled deflection voltage applied to the deflection electrodes. The deflection electrodes comprise first electrode means having a first potential and disposed on a first portion of the buffer layer, and second electrode means having a second potential different from the first potential and disposed on a second portion of the buffer layer. The optical deflector further includes isolating means for isolating the first and second portions of the buffer layer from each other.

In the optical deflector device of the present invention constructed as described above, the isolating means prevents a movement of electric charge through a portion of the buffer layer between the first and second portions, even if the buffer layer is electrically activated between the first and second portions on which the first and second electrode means having different potentials are formed. Hence, the isolating means is effective to eliminate an otherwise possible DC drift of the deflecting angle of the light rays with respect to the controlled deflection voltage.

According to one optional feature of the invention, the isolating means comprises at least one gap formed through a thickness of the buffer layer so as to define one of the first and second portions. For example, the gap may consist of a continuous groove formed so as to surround one of the first and second portions of the buffer layer.

According to another optional feature of the invention, the first electrode means comprises a pair of first electrodes disposed in spaced-apart relation in a direction substantially perpendicular to a direction of propagation of the light rays through the substrate, and a single second electrode having an inclined extension which is disposed between the pair of first electrodes such that the inclined extension intersects the direction of propagation.

In one form of the above feature of the invention, the isolating means comprises a first and a second groove which are formed through a thickness of the buffer layer, so as to surround and thereby define the first portion of the buffer layer.

In another form of the same feature of the invention, the substrate has a waveguide formed on one of opposite major surfaces thereof. The waveguide has a higher refractive index than the other portion of the substrate. The buffer layer is formed on the waveguide and has a refractive index lower than that of the waveguide.

In one arrangement of the above form of the invention, the optical deflector device further comprises a semiconductor laser chip positioned at one of opposite ends of the waveguide of the substrate, for generating a laser beam to be guided through the waveguide to a deflector portion which comprises the buffer layer and the first and second electrode means. In this case, the deflector device may further comprise a condensor portion disposed in the waveguide, between the laser chip and the deflector portion, for condensing the laser beam from the laser chip into parallel rays.

According to another aspect of the invention, there is provided an optical deflector device, comprising: (a) a substrate having an electro-optical effect and capable of guiding the light rays therethrough; (b) a buffer layer formed on one of opposite major surfaces of the substrate; and (c) a pair of first deflection electrodes and a second deflection electrode, for producing an electric field within the substrate, so that the light rays passing through the substrate are deflected in response to a change in the distribution of a refractive index of the substrate according to a controlled deflection voltage applied between the pair of first electrodes, and the second electrode. The first electrodes are disposed in spaced-apart relation in a direction substantially perpendicular to a direction of propagation of the light rays through the substrate. The second electrode is disposed on the buffer layer and has a portion which extends between the pair of first electrodes so as to intersect the direction of propagation of the light rays. The buffer layer has a first and a second cutout formed through a thickness thereof. The first electrodes are positioned within the first and second cutouts, respectively, and are disposed directly on the substrate, such that there exist gaps between peripheries of the first electrodes and inner surfaces of the first and second cutouts.

The optical deflector device according to the above aspect of the invention is also free from a drift of the deflecting angle, since the pair of first electrodes are disposed directly on the substrate, and are separated from the buffer layer on which the second electrode is disposed.

BRIEF DESCRIPTION OF THE DRAWINGS

The above and other objects, features and advantages of the invention will be better understood by reading the following description of a preferred embodiment of the invention, when considered in connection with the accompanying drawings, in which.

DETAILED DESCRIPTION OF THE PREFERRED EMBODIMENT

Figure 1:
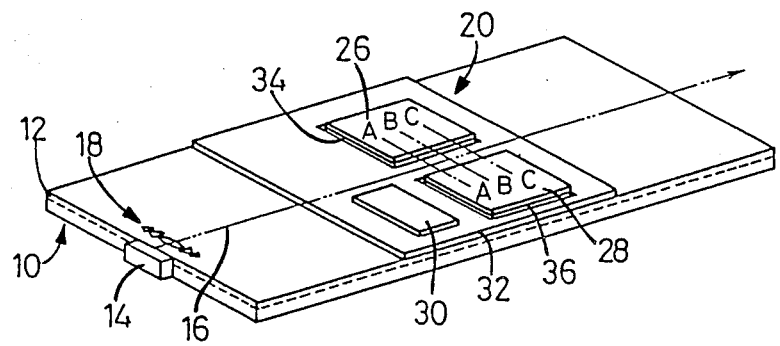
FIG. 1 is a perspective view of one embodiment of an optical deflector device of the present invention.

Referring first to FIG. 1, there is shown an optical deflector device having a generally rectangular substrate 10 which is made of an electro-optical material such as a single crystal of LiNbO$_3$. The substrate 10 has a thickness in the neighborhood of 0.5 mm. On one of opposite major surfaces of the substrate 10, there is provided a two-dimensional waveguide 12 formed as an integral, relatively thin layer. The waveguide portion 12 of the substrate 10 is made of a material whose refractive index is higher than that of the other portion of the substrate 10. The higher refractive index of the waveguide 12 enables the waveguide 12 to trap light rays passing therethrough, in the direction of its thickness. Thus, the waves of the light are properly guided or conducted through the interior of the waveguide 12. For example, the waveguide 12 is a comparatively thin layer of titanium (Ti) having several microns, which is formed by diffusion of Ti through the electro-optical material adjacent to the surface of the substrate 10. The substrate 10 and the layer of the waveguide 12 are integral with each other, and the refractive index is varied continuously across the interface or boundary between the substrate and waveguide 10, 12. The boundary is indicated in dashed line in FIG. 1.

A semiconductor laser chip 14 is attached to one of opposite end faces of the substrate 10, such that the chip 14 is optically coupled to the waveguide 12 at its corresponding longitudinal end, so that a laser beam radiated by the chip 14 is incident upon the waveguide 12. The laser radiation from the laser chip 14 is condensed into parallel rays while passing through a condenser portion in the form of a Fresnel lens portion 18, which is disposed within the waveguide 12, near the laser chip 14. Thus, the laser beam passes through the waveguide 12 along a centerline of the substrate 10, as indicated at 16 in FIG. 1, toward a deflector portion indicated generally at 20 in the figure. The deflector portion 20 is adapted to deflect the laser beam 16 over a predetermined angular range, as discussed below.

The Fresnel lens portion 18 is formed by diffusion of a suitable material such as titanium, or by applying the material by other suitable methods such as proton exchange, so that the distribution of the refractive index given by the applied material is similar to that of a Fresnel lens. However, the Fresnel lens portion 18 may be replaced by other condensing means, such as a geodesic lens which is provided in the form of a concave cavity formed in the surface of the waveguide 12.

Figure 5:
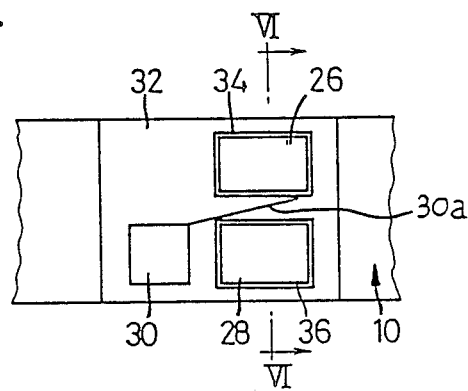
FIG. 5 is a fragmentary plan view of the device of FIG. 1.
Figure 6:
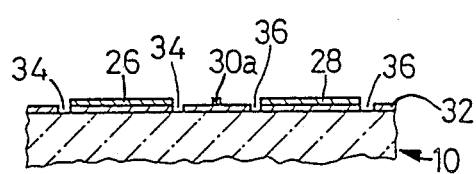
FIG. 6 is a fragmentary side elevational view in cross section taken along line VI—VI of FIG. 5.

The deflector portion 20 includes a buffer layer 32 formed on an intermediate portion of the upper surface of the waveguide 12. The deflector portion 20 further includes first electrode means in the form of a pair of first electrodes 26, 28, and second electrode means in the form of a second electrode 30 which has an inclined extension 30a as indicated in FIGS. 5 and 6.

The buffer layer 32 is made of a transparent material whose refractive index is lower than that of the two-dimensional waveguide 12. Preferably, the buffer layer 32 is a layer of SiO$_2$ which is formed by sputtering and has a thickness within a range between several angstroms and several microns. This buffer layer 32 is provided for the purpose of preventing the electrodes 26, 38, 30 from absorbing the energy of the laser beam which passes through the waveguide 12.

The first electrodes 26, 28 are disposed such that they are spaced apart from each other in a direction perpendicular to the direction of propagation of the laser beam 16 (i.e., perpendicular to the centerline of the substrate 10). In other words, the first electrodes 26, 28 are positioned on both sides of the centerline of the waveguide 12, while being spaced from the centerline by the same distance, so that the laser beam 16 passes between the two first electrodes 26, 28. As most clearly shown in FIG. 5, the second electrode 30 is disposed such that its inclined extension extends obliquely between the first electrodes 26, 28, so as to intersect the centerline of the waveguide 12.

Generally, the refractive index of an electro-optical material is changed according to an electric field through which light rays are passed. In the case where the substrate 10 is formed of a Y-cut crystal of LiNbO$_3$, for example, a variation $\Delta n$ in the refractive index of the portion between the first electrodes 26, 28 is expressed by the following formula (1):

$$\Delta n = (\tfrac{1}{2}) n_e^3 \, r_{33} \cdot E \tag{1}$$

where,
$n_e$: refractive index of the substrate 10 with respect to extraordinary wave;
$r_{33}$: electro-optical constant of the substrate 10 in the direction perpendicular to substrate centerline.

Figure 2:
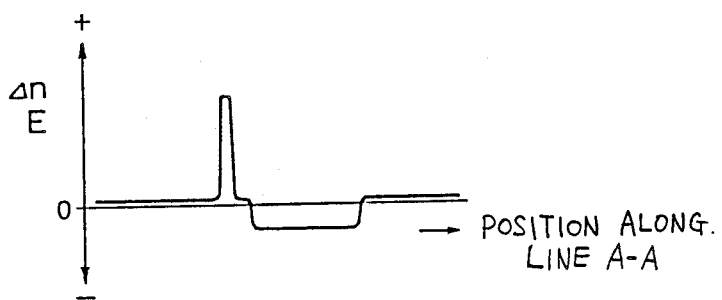
FIGS. 2, 3 and 4 are graphical representations showing distributions of electric field and variation in refractive index of a deflector portion of the device of FIG. 1, taken along lines A—A, B—B and C—C, respectively.
Figure 3:
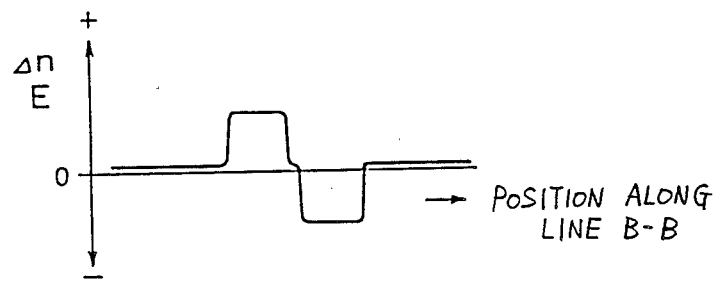
Figure 4:
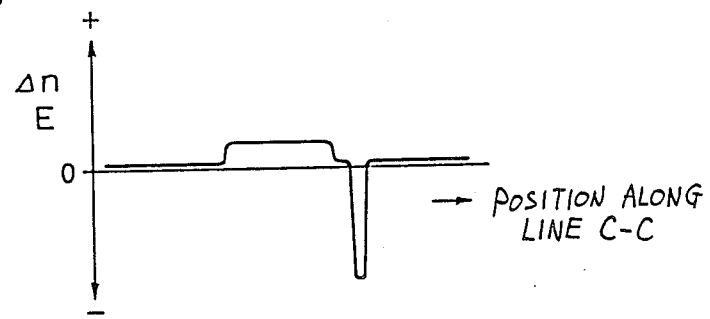

Namely, the distribution of the refractive index in the direction perpendicular to the centerline of the substrate, that is, the distribution of the variation Δn in the refractive index, is changed with the distribution of a magnitude of an electric field E produced at a portion between the electrodes 26, 28 upon application of a controlled deflection voltage between the first electrodes 26, 28 and the second electrode 30. For instance, when a positive potential is applied to the second electrode 30, while an earth potential is applied to the pair of first electrodes 26, 28, the electric field E and the refractive index variation Δn at positions A—A, B—B and C—C of the deflector portion 20 as indicated in FIG. 1, have the distributions as indicated in graphs of FIGS. 2, 3 and 4, respectively. In this condition, therefore, the laser rays transmitted parallel to the centerline of the waveguide 12 are subject to different average refractive indices while passing through the deflector portion 20. Namely, the rays passing nearest to the electrodes 26, 28 experience, for example, the lowest and highest refractive indices, respectively. Therefore, the laser flux is deflected toward one side of the waveguide centerline which has a higher refractive index than the other side. The deflection voltage applied between the first electrodes 26, 28 and the second electrode 30 is varied as a function of time, continuously or in steps. As a result, the angle of deflection of the laser beam 16 is accordingly varied according to a change in the deflection voltage. In the graphical representations in FIGS. 2-4, it is noted that the positions along lines A—A, B—B and C—C are viewed in the direction from the deflector portion 20 toward the Fresnel lens portion 18, and the positive side of the electric field E corresponds to the lower side of the waveguide centerline as viewed in FIG. 5.

As shown in FIGS. 5 and 6, the buffer layer 32 has two continuous closed gaps in the form of a first groove 34 and a second groove 36 which are formed through the thickness of the layer 32. The first groove 34 surrounds a rectangular portion of the buffer layer 32 on which the first electrode 26 is formed. Similarly, the second groove 36 surrounds a rectangular portion of the buffer layer 32 on which the other first electrode 28 is formed. These two grooves serve as isolating means for isolating the portion of the buffer layer 32 on which the first electrodes 26, 28 are formed, from the portion of the buffer layer 32 on which the second electrode 30 is formed. According to this arrangement, a movement of electric charge through the buffer layer 32 between the first electrodes 26, 28 and the second electrode 30 is blocked by the two grooves 34, 36, even if the buffer layer 32 is electrically activated. Thus, the isolating means 34, 36 eliminates an otherwise possible "DC drift", i.e., a deviation or error of the deflecting angle of the laser beam 16 from the nominal value determined by the applied deflection voltage.

The buffer layer 32, which is usually formed by sputtering of a suitable material such as $SiO_3$ on the substrate 10, is relatively easy to lack oxygen and become electrically activated at its local portions. If the portions of the buffer layer 32 on which the first electrodes 26, 28 are formed, and the portion of the buffer layer 32 on which the second electrode 30 is formed, are formed continuously, electric charge is moved through portions of the buffer layer 32 between the inclined extension 30a of the second electrode 30 and the first electrodes 26, 28, if these portions of the buffer layer 32 are electrically activated. The electric charge moving between the electrodes 30 and 26, 28 has an influence on the electric field produced by the electrodes, whereby the deflection angle of the laser beam 16 to be obtained by the deflector portion 20 is undesirably affected.

While the present invention has been described in its preferred embodiment, it is to be understood that the invention is not limited to the illustrated embodiment, but may be otherwise embodied.

Figure 7:
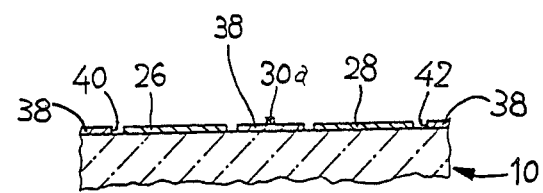
FIG. 7 is a view corresponding to that of FIG. 6, showing a modified embodiment of the invention.

For example, the buffer layer 32 may be replaced by a buffer layer 38 as illustrated in FIG. 7. This buffer layer 38 has a first cutout 40 in which the first electrode 26 is disposed directly on the substrate 10 (waveguide 12), and a second cutout 42 in which the other first electrode 28 is disposed directly on the substrate 10 (waveguide 12). The cutouts 40, 42 and the electrodes 26, 28 are dimensioned and positioned so that there exist small gaps between the peripheries of the electrodes 26, 28 and the inner surfaces of the cutouts 40, 42. In this case, too, no electric charge can move between the first and second electrodes 26, 28, 30. It is noted that since the laser beam 16 does not pass under the first electrodes 26, 28, the absorption of the optical energy by these electrodes 26, 28 is negligible.

Further, the first and second grooves 34, 36 of the first embodiment which surround the rectangular portions of the buffer layer 32, may be replaced by a single continuous groove formed so as to surround the second electrode 30. Alternatively, it is possible to provide a buffer layer which consists of three separate parts on which the two first electrodes 26, 28 and the second electrode 30 are formed. In this instance, the three separate parts are disposed with suitable gaps therebetween. In either case, the isolating means provided according to the principle of the invention is adapted to avoid an otherwise possible movement of electric charge which affects the electric field produced by the electrodes, when the buffer layer is electrically activated as previously described.

It is to be understood that the invention may be embodied with various other changes, modifications and improvements which may occur to those skilled in the art, without departing from the spirit and scope of the invention defined in the following claims.

What is claimed is:

1. An optical deflector device for deflecting light rays, comprising:
    a substrate having an electro-optical effect and capable of guiding the light rays therethrough;
    a buffer layer formed on one of opposite major surfaces of said substrate; and
    a plurality of deflection electrodes formed on said buffer layer to produce an electric field within said substrate, so that the light rays passing through said substrate are deflected in response to a change in the distribution of a refractive index of said substrate according to a controlled deflection voltage applied to said deflection electrodes, said deflection electrodes comprising first electrode means having a first potential and disposed on a first portion of said buffer layer, and second electrode means having a second potential different from said first potential and disposed on a second portion of said buffer layer;
    said buffer layer having at least one continuous groove formed through a thickness thereof so as to surround one of said first and second portions thereof and thereby isolate said first and second portions from each other.

2. An optical deflector device according to claim 1, wherein said first electrode means comprises a pair of first electrodes disposed in spaced-apart relation in a direction substantially perpendicular to a direction of propagation of the light rays through said substrate, and wherein said second electrode means comprises a single second electrode having an inclined extension which is disposed between said pair of first electrodes such that said inclined extension intersects said direction of propagation.

3. An optical deflector device according to claim 2, wherein said at least one continuous groove comprises first and second continuous grooves which are formed so as to surround and thereby define two parts of said first portion of said buffer layer on which said pair of first electrodes are disposed, respectively.

4. An optical deflector device according to claim 2, wherein said substrate has a waveguide formed on one of opposite major surfaces thereof, said waveguide having a higher refractive index than that of the other portion of the substrate, said buffer layer being formed on said waveguide and having a refractive index lower than that of said waveguide.

5. An optical deflector device according to claim 4, further comprising a semiconductor laser chip positioned at one of opposite ends of said waveguide of the substrate, for generating a laser beam to be guided through said waveguide to a deflector portion which comprises said buffer layer and said first and second electrode means.

6. An optical deflector device according to claim 5, wherein said laser beam is guided by said waveguide so as to pass between said pair of first electrodes of said deflector portion.

7. An optical deflector device according to claim 6, further comprising a condensor portion disposed in said waveguide, between said laser chip and said deflector portion, for condensing the laser beam from said laser chip into parallel rays.

8. An optical deflector device for deflecting light rays, comprising:
a substrate having an electro-optical effect and capable of guiding the light rays therethrough;
a buffer layer formed on one of opposite major surfaces of said substrate;
a pair of first deflection electrodes and a second deflection electrode, for producing an electric field within said substrate, so that the light rays passing through said substrate are deflected in response to a change in the distribution of a refractive index of said substrate according to a controlled deflection voltage applied between said pair of first electrodes, and said second electrode, said pair of first electrodes being disposed in spaced-apart relation in a direction substantially perpendicular to a direction of propagation of the light rays through said substrate, said second electrode being disposed on said buffer layer and having a portion which extends between said pair of first electrodes so as to intersect said direction of propagation of the light rays; and
said buffer layer having a first and a second cutout formed through a thickness thereof, said pair of first electrodes being positioned within said first and second cutouts, respectively, and disposed directly on said substrate, such that there exist gaps between peripheries of said first electrodes and inner surfaces of said first and second cutouts.

9. An optical deflector device for deflecting light rays, comprising:
a substrate having an electro-optical effect and capable of guiding the light rays therethrough;
a buffer layer formed on one of opposite major surfaces of said substrate;
a plurality of deflection electrodes formed on said buffer layer to produce an electric field within said substrate, so that the light rays passing through said substrate are deflected in response to a change in the distribution of a refractive index of said substrate according to a controlled deflection voltage applied to said deflection electrodes, said deflection electrodes comprising a pair of first electrodes having a first potential and being disposed on a first portion of said buffer layer in spaced-apart relation in a direction substantially perpendicular to a direction of propogation of the light rays through said substrate, and a single second electrode having a second potential different from said first potential, being disposed on a second portion of said buffer layer, and having an inclined extension which is disposed between said pair of first electrodes such that said inclined extension intersects said direction of propagation; and
isolating means for isolating said first and second portions of said buffer layer from each other, said isolating means comprising first and second continuous grooves formed through a thickness of said buffer layer so as to surround and thereby define said first portion of said buffer layer.

* * * * *